United States Patent
Jackson

(10) Patent No.: US 8,132,474 B2
(45) Date of Patent: Mar. 13, 2012

(54) HALL EFFECT HELICOPTER MAST TORQUE METER

(75) Inventor: K. Myron Jackson, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 274 days.

(21) Appl. No.: 12/521,110

(22) PCT Filed: Jan. 16, 2007

(86) PCT No.: PCT/US2007/001087
§ 371 (c)(1),
(2), (4) Date: Jun. 24, 2009

(87) PCT Pub. No.: WO2008/088326
PCT Pub. Date: Jul. 24, 2008

(65) Prior Publication Data
US 2010/0030495 A1    Feb. 4, 2010

(51) Int. Cl.
*G01L 3/00* (2006.01)
(52) U.S. Cl. .................................. 73/862.331
(58) Field of Classification Search ........... 73/862.331–862.338
See application file for complete search history.

(56) References Cited

U.S. PATENT DOCUMENTS

| | | | |
|---|---|---|---|
| 3,538,762 A | 11/1970 | Parkinson et al. | |
| 3,824,848 A | 7/1974 | Parkinson | |
| 4,083,518 A | 4/1978 | Garrison et al. | |
| 4,424,947 A * | 1/1984 | Adams et al. | 244/134 D |
| 4,774,845 A | 10/1988 | Barbe et al. | |
| 5,228,349 A | 7/1993 | Gee et al. | |
| 6,295,006 B1 | 9/2001 | Kohlhepp | |

OTHER PUBLICATIONS

Written Opinion in PCT/US07/01087, mailed Jul. 30, 2008.
International Preliminary Report on Patentability in PCT/US07/01087, dated Sep. 20, 2009.
First Office Action in Chines Patent Application 2007800499588, dated Dec. 31, 2010.
Search Report in European Patent Application 07748923, dated Mar. 3, 2011, 6 pages.

\* cited by examiner

*Primary Examiner* — Lisa Caputo
*Assistant Examiner* — Octavia Davis
(74) *Attorney, Agent, or Firm* — James E. Walton; Noah A. Tevis

(57) ABSTRACT

A Hall effect helicopter mast torque meter includes a stand pipe, a first magnet, a second magnet, and a sensor. The stand pipe is connected to the top of the mast such that the stand pipe rotates at the same velocity as the mast. The first magnet is operably associated with the stand pipe which is operably associated with the top of the mast. The second magnet is operably associated with the bottom of the mast. The sensor detects the magnetic field of the first magnet and the second magnet.

20 Claims, 2 Drawing Sheets

HALL EFFECT HELICOPTER MAST TORQUE METER

TECHNICAL FIELD

The present invention relates generally to torque meters. More specifically, the present invention relates torque meters for masts of rotorcrafts.

DESCRIPTION OF THE PRIOR ART

Currently, the mast torque in a rotorcraft mast, such as a helicopter mast, is measured by measuring the rotational phase shift, or torsion, between a precision gear attached to the top of the helicopter mast and an identical precision gear attached to the bottom of the helicopter mast. The rotational phase shift between these two gears, which is caused by the twisting of the helicopter mast, is measured using an inductance device.

These splined, precision gears have to be precisely aligned and since they must be detected by an inductance device they are made from a magnetic steel. As such, these precision gears are heavy and costly. The inductance device has substantial copper content and is also heavy and costly to produce. The precision gears plus the inductance device typically weigh three to four pounds. Recently, advances have been made that allow the use of smaller inductive coils, thereby reducing the weight of the meter somewhat.

Although there have been significant developments in the area of detecting torque for rotorcraft masts, considerable shortcomings remain.

BRIEF DESCRIPTION OF THE DRAWINGS

The novel features believed characteristic of the torque meter of the present application are set forth in the appended claims. The torque meter of the present application itself, however, as well as, a preferred mode of use and further objectives and advantages thereof, will best be understood by reference to the following detailed description of an illustrative embodiment when read in conjunction with the accompanying drawings, wherein:

DESCRIPTION OF THE PREFERRED EMBODIMENT

In the preferred embodiment, a pair of magnets and a Hall Effect transistor is used to determine the torque of a rotorcraft mast. The magnets and Hall Effect transistor do not require precise alignment. One magnet references the top of the mast, while the other magnet references the bottom of the mast. The magnet that references the top of the mast experiences a rotational phase shift as the mast twists. The magnet that references the bottom of the mast is used along with the magnet that references the top of the mast to calibrate a "no twist" setting and to determine the phase shift experienced by the magnet referencing the top of the mast.

A Hall Effect transistor provides a pulse each time a magnet passes by as the mast rotates. The pulses from the transistor are recorded by a data processing system and the phase shift between the two pulses and the initial no twist calibration setting are calculated. This calculated phase shift is directly proportional to the torque on the mast. Mast speed can also be measured by measuring the time between pulses for a particular magnet.

This is advantageous over previous solutions in that the Hall Effect torque meter of the present application utilizes two magnets and a single Hall Effect transistor, which are light weight and inexpensive, to determine torque in the helicopter mast as opposed to heavy, expensive splined precision gears that have to be precisely aligned along with an inductive coil device.

Figure 1:
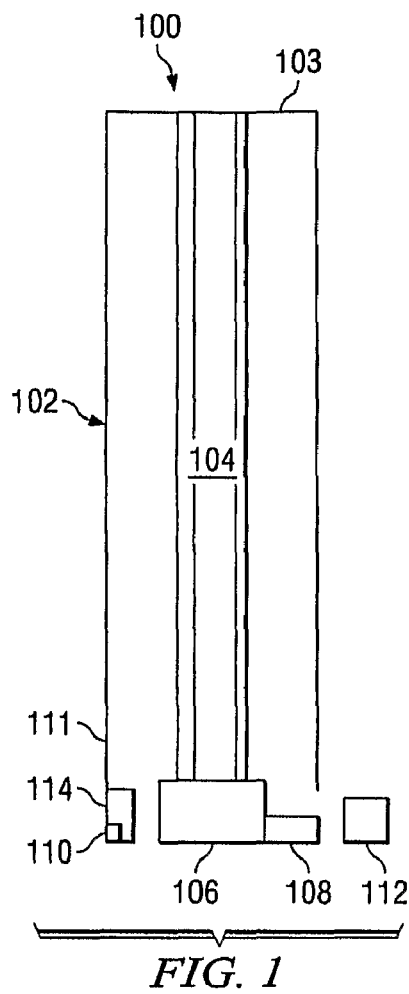
FIG. 1 is a simplified schematic of the preferred embodiment of a Hall Effect torque meter according to the present application.

Referring to FIG. 1 in the drawings, a simplified schematic of the preferred embodiment of a Hall Effect torque meter 100 according to the present application is illustrated. Torque meter 100 is coupled to a rotorcraft mast 102. A set of rotor blades (not shown) is coupled to mast 102. A stand pipe 104 is fixed rigidly to a top portion 103 of mast 102, and extends along the length of mast 102. Stand pipe 104 is connected to top portion 103 of mast 102, such that when mast 102 rotates, stand pipe 104 rotates, as well. Any torsional deflection experienced by top portion 103 of mast 102 is also, proportionally, experienced by stand pipe 104. Stand pipe 104 is coupled to an adapter 106, that, in turn, is coupled to a first magnet 108. Adapter 106 is connected to stand pipe 104, such that when stand pipe 104 rotates, adapter 106 rotates at the same velocity. This causes first magnet 108 to rotate at the same velocity as stand pipe 104, which rotates at the same velocity as top portion 103 of mast 102. In this manner, first magnet 108 is referenced to top portion 103 of mast 102. A second magnet 110 is coupled to a bottom portion 111 of mast 102 via an assembly 114. This causes second magnet 110 to rotate at the same velocity as bottom portion 111 of mast 102. In this manner, second magnet 110 is referenced to bottom portion 111 of mast 102.

In the preferred embodiment, magnets 108 and 110 are placed 180 degrees apart from each other on the same plane. As mast 102 and stand pipe 104 rotate, magnets 108 and 110 are rotated past a sensor unit 112. Sensor unit 112 comprises a Hall Effect transistor. Because magnets 108 and 110 are generally disposed on the same plane, sensor unit 112 only requires a single Hall Effect transistor to sense the magnetic fields of each magnet 108 and 110 as magnets 108 and 110 rotate by sensor unit 112. It should be understood that magnets 108 and 110 do not need to be separated from each other by 180 degrees. Indeed, magnets 108 and 110 may be offset from each other by any desirable amount. Furthermore, it will be appreciated that magnets 108 and 110 do not have to be exactly aligned. It is not necessary that magnets 108 and 110 be disposed in the same plane. It is only necessary that the Hall Effect transistor of sensor unit 112 be able to detect magnets 108 and 110 as separate entities.

In the preferred embodiment, a calibration point of zero torque is set for the system. This occurs when the rotor blades coupled to mast 102 are removed and the mast is rotated. As the pitch of the rotor blades changes, mast torque is required to turn the rotor blades. This torque is transferred from the engine to mast 102 and to the rotor blades and top portion 103 of mast 102. This torque acting on top portion 103 of mast 102 results in torsional twisting of mast 102. The top portion 103 of mast 102 experiences a torsional deflection that is proportional to the torque transferred to the rotor blades. Stand pipe 104, being coupled to the top portion 103 of mast 102, follows the rotational twist of top portion 103. This torsional twisting of mast 102 causes a rotational lag between top portion 103 of mast 102 and bottom portion 111 of mast 102. This rotational lag results in a phase shift between magnets 108 and 110, which is detected by the Hall Effect transistor of sensor unit 112. This phase shift is calculated by a data processing system and compared to the initial zero torque calibration setting. Based upon this comparison, the amount of torque being experienced by mast 102 can be calculated. The torque experienced by mast 102 is directly proportional to the positional phase shift detected. It will be appreciated that various other factors and material properties, such as temperature, spring rate the materials being measured, and so forth, are included in the calculation of the actual torque experienced by mast 102. The data processing system may be a flight control computer or other suitable computer.

Figure 2:
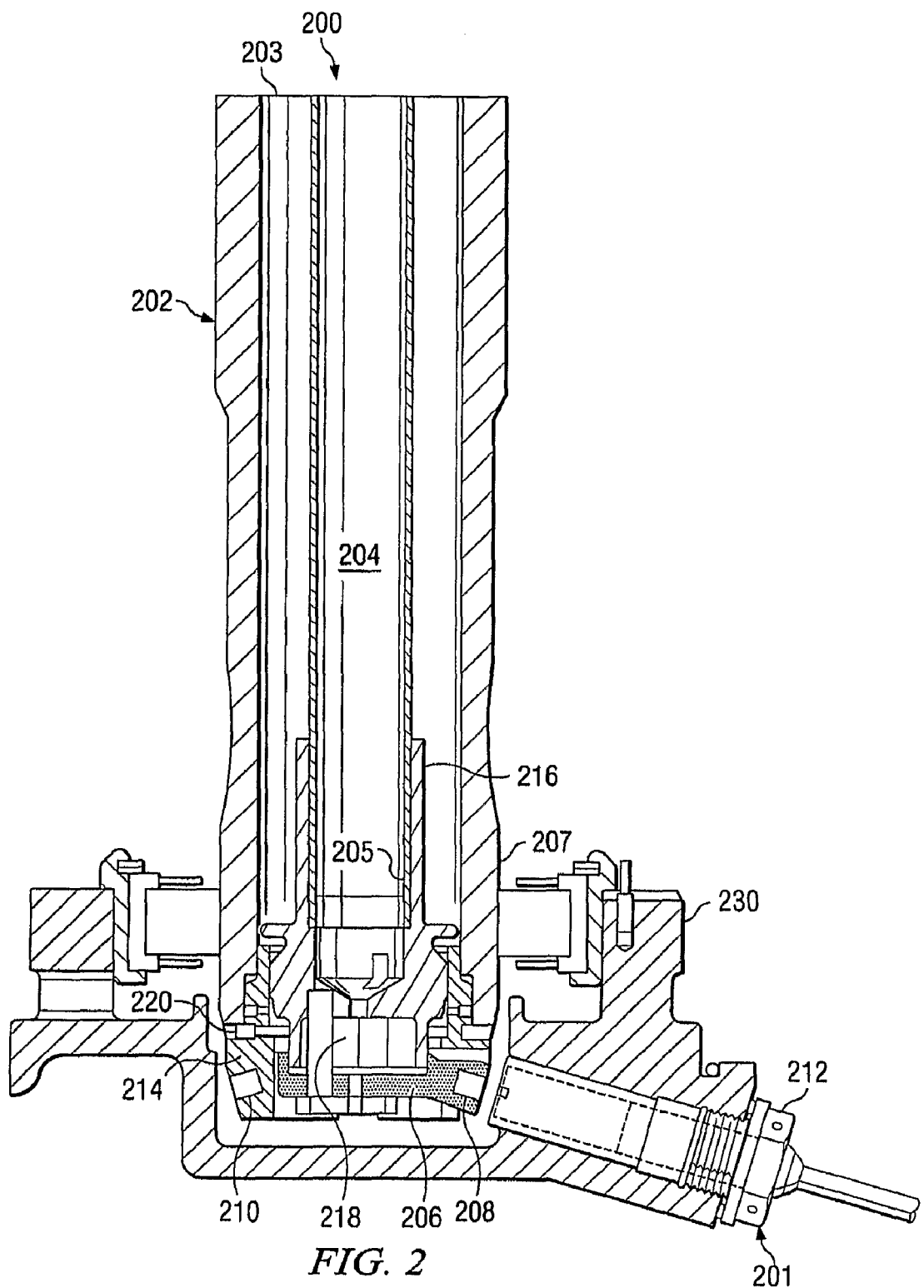
FIG. 2 is a longitudinal cross-sectional view of a helicopter mast assembly in accordance with a preferred embodiment of the Hall Effect torque meter according to the present application.

Referring now also to FIG. 2 in the drawings, a longitudinal cross-sectional view of an exemplary helicopter mast assembly 200 in accordance with the preferred embodiment of the present application is illustrated. A Hall Effect torque meter 201 is coupled to a rotorcraft mast 202. A set of rotor blades (not shown) is coupled to mast 202. A stand pipe 204 is fixed rigidly to a top portion 203 of mast 202, and extends along the length of mast 202. Stand pipe 204 is connected to top portion 203 of mast 202, such that when mast 202 rotates, stand pipe 204 rotates at the same velocity. Any torsional deflection experienced by top portion 203 of mast 202 is also, proportionally, experienced by stand pipe 204. A lower end 205 of stand pipe 204 is coupled to a roller bearing assembly 218 via an adapter 216. Adapter 216 is coupled to actuator assembly 206 that houses, or is otherwise operably associated with, a first magnet 208. Actuator assembly 206 is coupled to stand pipe 204, such that when stand pipe 204 rotates, actuator assembly 206 rotates at the same velocity. This causes first magnet 208 to rotate at the same velocity as stand pipe 204. In this manner, first magnet 208 is referenced to top portion 203 of mast 202. A nut assembly 214 and a locking spring 220 are coupled to a bottom portion 207 of mast 202. A second magnet 210 is coupled to, or otherwise operably associated with, nut assembly 214, such that when mast 202 rotates, second magnet 210 rotates at the same velocity. In this manner, second magnet 210 is referenced to bottom portion 207 of mast 202.

As is shown, magnets 208 and 210 are disposed 180 degrees apart from each other on roughly the same plane. As mast 202 and pipe 204 rotate, magnets 208 and 210 are rotated past a sensor unit 212. Sensor unit 212 comprises a Hall Effect transistor. In this embodiment, sensor unit 212 is installed in an inclined position into a base housing 230. This configuration significantly reduces the amount of space required for torque meter 201. Because magnets 208 and 210 are disposed on roughly the same plane, sensor unit 212 only requires a single Hall Effect transistor to sense the magnetic field of each magnet 208 and 210 as magnets 208 and 210 rotate past sensor unit 212. This configuration reduces the overall weight of the unit and the amount of space required for the unit as compared to conventional devices that use induction coils and splined precision aligned gears. It will be appreciated that sensor unit 212 may be coupled to the mast assembly in a wide variety of ways, provided that sensor unit 212 is capable of sensing the magnetic fields of magnets 208 and 210. The present application anticipates and incorporates all such methods and locations for attaching sensor unit 212. Thus, the present application is not limited to the physical configuration depicted.

Figure 3:
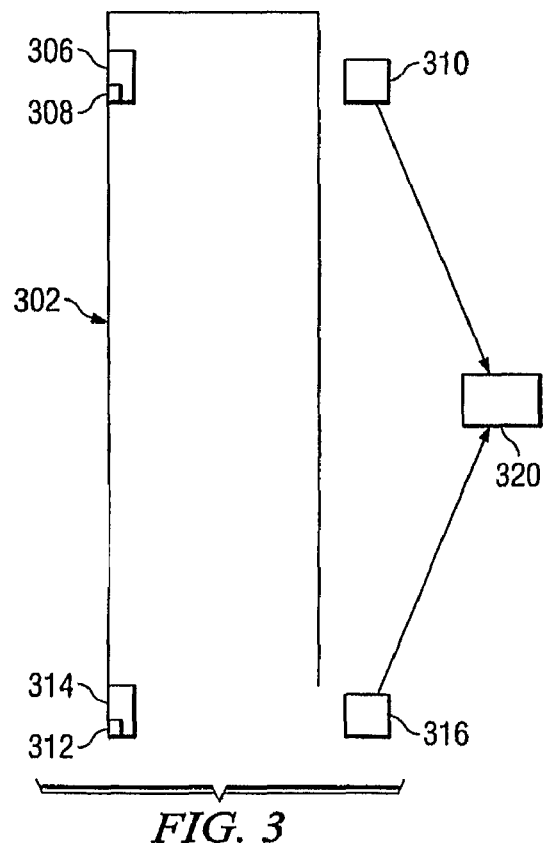
FIG. 3 is a simplified schematic of an alternate embodiment of the Hall Effect torque meter according to the present application.

Referring now also to FIG. 3 in the drawings, a simplified schematic of an alternate embodiment of the Hall Effect torque meter of the present application is illustrated. In this embodiment, a helicopter mast 302 is coupled to a set of rotor blades (not shown). A first adapter 306 is coupled to, or otherwise operably associated with, mast 302 at a first location. First adapter 306 is coupled to a first magnet 308. In this embodiment, first adapter 306 is coupled to mast 302, such that when mast 302 rotates, first adapter 306 rotates at the same velocity. This causes first magnet 308 to be rotated at the same velocity as the first location of mast 302. In this manner, first magnet 308 is referenced to the first location of mast 302. A first sensor 310, which is located at or near the first location of mast 302 detects the magnetic field of first magnet 308 each time first magnet 308 passes by sensor 310.

Similarly, a second adapter 314 is coupled to, or otherwise operably associated with, mast 302 at a second location. Second adapter 314 is coupled to a second magnet 312. In this embodiment, second adapter 314 is coupled to mast 302, such that when mast 302 rotates, second adapter 314 rotates at the same velocity. This causes second magnet 312 to be rotated at the same velocity as the second location of mast 302. In this manner, second magnet 312 is referenced to the second location of mast 302. A second sensor 316, which is located at or near the second location of mast 302 detects the magnetic field of second magnet 312 each time second magnet 312 passes by second sensor 316. It should be noted that although first magnet 308 is shown connected to mast 302 at a first location via first adapter 306 located near the top of mast 302, first magnet 308 may be coupled to mast 302 at various locations and still reference the top portion of mast 302. Likewise, it should be understood that second magnet 312 could be coupled to mast 302 at various locations and still reference the bottom portion of mast 302. Additionally, in some particular implementations, it may be desirous to have magnets 308 and 312 reference locations other than the top and the bottom of mast 302 in order to measure the torque applied to a specific region of mast 302. In any such implementations, sensors 310 and 316 would be placed such that sensors 310 and 316 could detect the magnetic field of the associated magnets 308 and 312.

Sensors 310 and 316 are connected to a data processing system 320, which may be a flight control computer or other suitable computing device. Data processing system 320 receives input from sensors 310 and 316 and calculates the torque being applied to mast 302. A calibration point of zero torque is set for the system. This occurs when the rotor blades coupled to mast 302 are removed and the mast is rotated. As mast 302 rotates, sensors 310 and 316 detect magnets 308 and 312 as magnets 308 and 312 pass by sensors 310 ad 316. This information is passed to data processing system 320, which records the occurrences of the detection of magnets 308 and 312. The difference in the timing of the detection of magnets 308 and 312 is set as the zero torque calibration. As the pitch of the rotor blades changes, mast torque is required to turn the rotor blades. This torque is transferred from the engine to mast 302 and to the rotor blades and the top portion of mast 302. This torque acting on the top portion of mast 302 results in torsional twisting of mast 302. The top portion of mast 302 experiences a torsional deflection that is proportional to the torque transferred to the rotor blades. First adapter 306, being coupled to the first location of mast 302, follows the rotational twist of the first location of mast 302. This torsional twisting of mast 302 causes a rotational lag between the first location of mast 302 and the second location of mast 302. This rotational lag results in a phase shift between magnets 308 and 312, which is detected by the Hall Effect transistors of sensors 310 and 316. This phase shift is calculated by the data processing system and compared to the initial zero torque calibration setting. Based upon this comparison, the amount of torque being experienced by mast 302 can be calculated. The torque experienced by mast 302 is directly proportional to the positional phase shift detected. It will be appreciated that various other factors and material properties, such as temperature, spring rate of the materials being measured, and so forth, are included in the calculation of the actual torque experienced by mast 3

The Hall effect torque meter of the present application provides significant benefits and advantages, including, but not limited to: (1) the system is lighter weight; (2) the system requires less space; (3) the system is easier to install; (4) the system is easier to maintain; (5) the system is less expensive; and (6) the system is simple to calibrate.

Although the Hall Effect torque meter of the present application has been described with reference to determining the torque imparted upon a helicopter mast, it will be appreciated that the method and apparatus of the torque meter disclosed herein may be used in a wide variety of other fields and applications. The Hall Effect torque meter of the present application may be used to determine the torque in any type of shaft or mast. In addition, the Hall Effect torque meter of the present application may also be used to determine many different types of physical, functional, and operational properties across many different applications.

It is apparent that an invention with significant advantages has been described and illustrated. Although the present application has been shown in a limited number of forms, it is not limited to just these forms, but is amenable to various changes and modifications without departing from the spirit thereof.

The invention claimed is:

1. A system for detecting torque in a mast, the system comprising:
    a stand pipe coupled to the mast, such that the stand pipe rotates at the same velocity as the mast;
    a first magnet operably associated with the stand pipe, such that rotation of the stand pipe causes similar rotation of the first magnet;
    a second magnet operably associated with the mast, such that rotation of the mast causes similar rotation of the second magnet; and
    a sensor for detecting the magnetic fields of the first magnet and the second magnet.

2. The system according to claim 1, wherein the sensor comprises:
    a Hall Effect transistor.

3. The system according to claim 1, wherein the first magnet is referenced to a top portion of the mast and the second magnet is referenced to a bottom portion of the mast.

4. The system according to claim 1, wherein the first magnet and the second magnet are generally disposed in the same plane.

5. The system according to claim 1, wherein the first magnet is offset from the second magnet by a selected angle.

6. The system according to claim 5, wherein the selected angle is about 180 degrees.

7. The system according to claim 1, wherein the stand pipe is coupled to a top portion of the mast, the first magnet is coupled to a bottom portion of the stand pipe, and the second magnet is coupled to a bottom portion of the mast.

8. The system according to claim 1, wherein the first magnet is coupled to a nut assembly.

9. The system according to claim 1, wherein the second magnet is coupled to a roller bearing assembly.

10. The system according to claim 1, wherein the sensor is disposed at an angle relative to the mast.

11. The system according to claim 1, further comprising:
    a data processing system for determining torque imparted upon the mast in response to signals from the sensor.

12. The system according to claim 11, wherein the data processing system is programmed to calculate a zero torque reference point based on the location of the first magnet relative to the second magnet.

13. The system according to claim 11, wherein the data processing system is programmed to calculate the torque imparted upon the mast as a function of a phase shift between the first magnet and the second magnet.

14. The system according to claim 11, wherein the data processing system is programmed to calculate a rotational velocity of the mast in response to signals from the sensor.

15. A system for detecting torque in a shaft, the system comprising:
    a first magnet operably associated with a first location on the shaft, such rotation of the shaft causes the first magnet to similarly rotate;
    a second magnet operably associated with a second location on the shaft, such rotation of the shaft causes the second magnet to similarly rotate;
    a first sensor for detecting a magnetic field of the first magnet;
    a second sensor for detecting a magnetic field of the second magnet; and
    a data processor for processing signals from the first sensor and the second sensor.

16. The system according to claim 15, wherein the first location is near one end of the shaft and the second location is near the other end of the shaft.

17. The system according to claim 15, wherein the first sensor includes a first Hall Effect transistor and the second sensor includes a second Hall Effect transistor.

18. A method of determining the torque imparted upon a mast of a rotorcraft, the method comprising the steps of:
    referencing a first magnet with one end portion of the mast, the first magnet being configured such that rotation of the one end portion of the mast causes similar rotation of the first magnet;
    referencing a second magnet with the other end portion of the mast, the second magnet being configured such that rotation of the other end portion of the mast causes similar rotation of the second magnet;
    providing a sensor for detecting the magnetic fields of the first magnet and the second magnet and for generating signals corresponding to the rotation of the first magnet and the second magnet;
    providing a data processing system for processing the signals from the sensor; and
    determining the torque imparted upon the mast with the data processing system in response to the signals from the sensor.

19. The method according to claim 18, further comprising the step of:
    calculating a zero torque reference point for the first magnet and the second magnet, the zero torque reference point corresponding to a condition in which rotor blades coupled to the mast are set to zero pitch.

20. The method according to claim 18, wherein the step of referencing the first magnet with one end portion of the mast is achieved by coupling one end of a standpipe to the one end portion of the mast and coupling the first magnet to the other end of the standpipe.

* * * * *